(12) United States Patent
Boulet D'Auria

(10) Patent No.: US 6,334,465 B2
(45) Date of Patent: Jan. 1, 2002

(54) DEVICE FOR STOPPING A LEAK IN A PIPE

(75) Inventor: Stanislas Boulet D'Auria, Cap d'Ail (FR)

(73) Assignees: 3X Engineering, Monaco (MC); Submin Limited, Dublin (IE)

( * ) Notice: Subject to any disclaimer, the term of this patent is extended or adjusted under 35 U.S.C. 154(b) by 0 days.

(21) Appl. No.: 09/779,836

(22) Filed: Feb. 9, 2001

Related U.S. Application Data

(63) Continuation of application No. PCT/FR99/01982, filed on Aug. 12, 1999, now abandoned.

(30) Foreign Application Priority Data

Aug. 12, 1998 (FR) ............................................. 98 10531

(51) Int. Cl.[7] ................................................. F16L 55/16
(52) U.S. Cl. .......................................... 138/99; 138/97
(58) Field of Search ............................. 138/99, 97, 98; 24/279

(56) References Cited

U.S. PATENT DOCUMENTS

| 2,776,153 | A |   | 1/1957 | Smith ........................ 138/99 X |
| 4,606,377 | A |   | 8/1986 | Montgomery ................. 138/99 |
| 5,247,967 | A | * | 9/1993 | Bourque ....................... 138/99 |
| 5,333,916 | A | * | 8/1994 | Burkit et al. .................. 285/97 |
| 5,497,808 | A | * | 3/1996 | Schlund et al. ............... 138/99 |
| 5,706,862 | A | * | 1/1998 | Meinerding, Sr. ............ 138/99 |

FOREIGN PATENT DOCUMENTS

| DE | 89 14 186 | 1/1990 |
| EP | 0 079 457 | 5/1953 |
| GB | 2 072 790 | 10/1981 |

* cited by examiner

Primary Examiner—Patrick Brinson
(74) Attorney, Agent, or Firm—James C. Lydon

(57) ABSTRACT

A device for stopping a leak in a pipe having at least one crack, including an elastomer sheet applied against the crack with a force applicator and a clamping mechanism arranged around the pipe for applying a force on the force applicator. The force applicator includes shearing elements preferably consisting of a first group of rigid parallel partitions and a second group of parallel partitions arranged perpendicularly to the partitions of the first group, the partitions being arranged perpendicularly to the pipe and applying shearing efforts on the elastomer sheet on the site of the crack, forcing the elastomer to be deformed so as to match the shape of the crack, thereby stopping it.

10 Claims, 2 Drawing Sheets

DEVICE FOR STOPPING A LEAK IN A PIPE

This application is a continuation of International Application PCT/FR99/01982, filed Aug. 12, 1999, and now abandoned.

TECHNICAL FIELD

The present invention relates to the repair of pipes used to transport water, gas and other fluids, and particularly a device for stopping a leak in a pipe.

BACKGROUND ART

A leak in a water or gas pipe may be repaired by different techniques. One of these techniques consists in stopping the leak by applying an elastomer on the cracks present on the pipe by means of a sleeve. Such a sleeve is comprised of two half-shells, the interior wall of which is made of elastomer and adapted to surround the pipe at the area where the cracks are located. The half-shells are secured together and clamped to the pipe by threaded rods or other means.

Unfortunately, stopping leaks with this type of sleeve presents numerous inconveniences. The sleeve must be clamped with considerable force so that the elastomer applies a force greater than the pressure of the fluid inside the pipe, which can sometimes reach 100 bar. The two half-shells which form the sleeve are generally made of steel and thus quite heavy and expensive. Implementation is delicate and painstaking, and may take 7 to 8 hours. Furthermore, new cracks may occur under the clamping force if the operation is not performed properly. Finally, the half-shells used to form the sleeve are adapted to a specific diameter of pipe, requiring as many diameters of shells as there are pipe diameters.

SUMMARY OF THE INVENTION

This is why the object of the invention is to provide a device for stopping a leak in a pipe which can be quickly installed and does not require considerable clamping force.

Another object of the invention is to provide a device for stopping a leak in a pipe that is light-weight, inexpensive and which can be adapted to pipes of different diameters.

The invention relates therefore to a device for stopping a leak in a pipe having at least one crack, comprising an elastomer sheet applied against the crack with a force applicator and a clamping mechanism arranged around the pipe for applying a force to the force applicator. The invention is characterized in that the force applicator includes shearing elements arranged radially in relation to the pipe and applying shearing forces on the elastomer on the location of the crack, forcing the elastomer to be deformed so as to match the shape of the crack, thereby stopping the leak.

BRIEF DESCRIPTION OF THE DRAWINGS

The objects, features and advantages of the invention will become more apparent from the following description when taken in conjunction with the accompanying drawings in which.

DETAILED DESCRIPTION OF THE INVENTION

Figure 1:
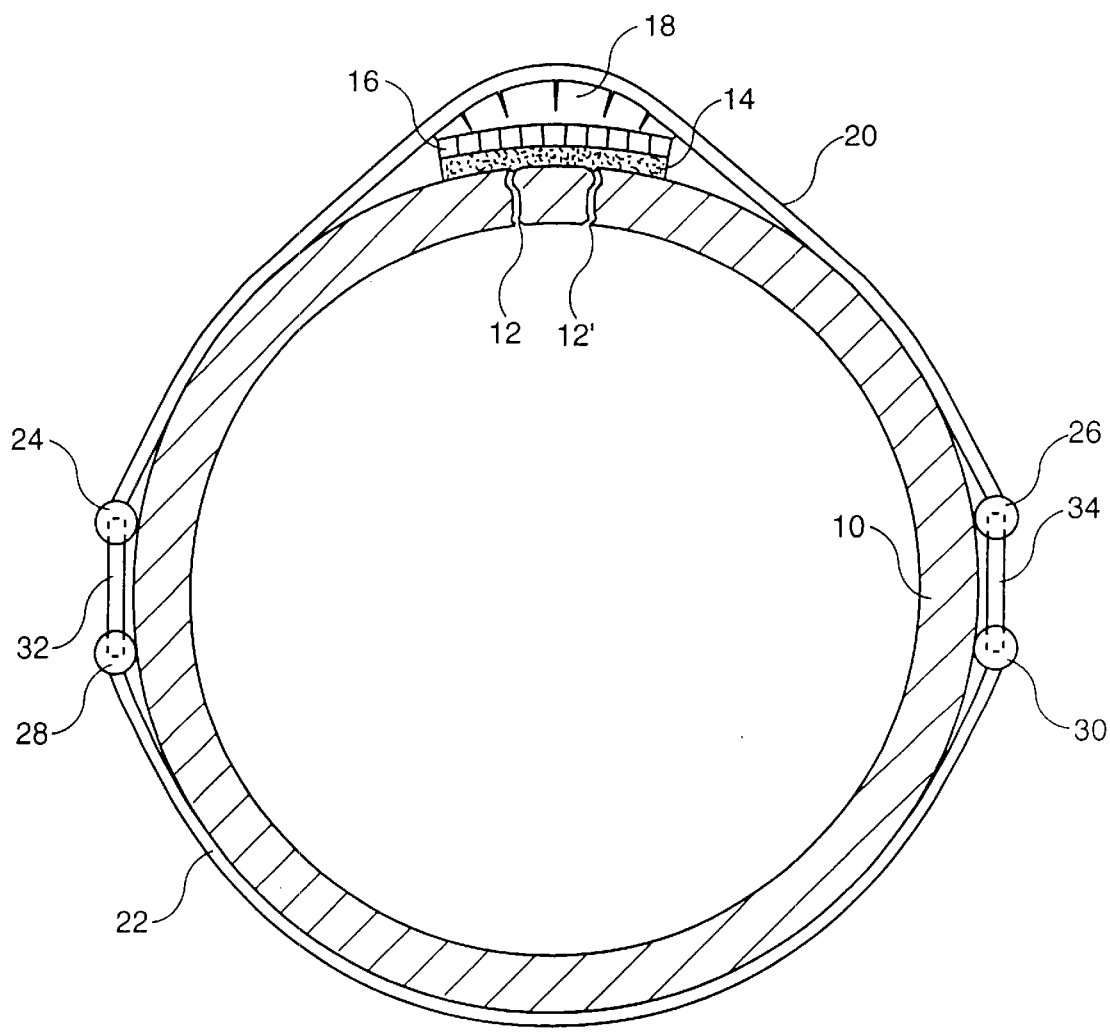
FIG. 1 represents a pipe having cracks on which the leak stopping device according to the invention is installed.

FIG. 1 shows a cross-sectional view of a pipe 10 designed to transport a fluid such as a liquid or a gas, and presenting cracks 12 and 12' in its upper section. On these cracks is placed an incompressible elastomer sheet 14 having good creep strength, such as rubber or neoprene, and having a thickness between 0.3 and 3 cm, designed to stop the leak by penetrating into the upper part of the cracks by pressure. Above the elastomer sheet 14 is a force applicator 16 of approximately the same size as the elastomer sheet 14 and designed to apply shear forces on the elastomer sheet. A force distributor 18, placed on top of the force applicator 16, is designed to distribute the clamping forces caused by the tightening of a clamping strap which is comprised, in this case, of two strap portions 20 and 22. Each strap portion is stretched between two end rods. In this manner, the strap portion 20 features the two end rods 24 and 26 while the strap portion 22 features the two end rods 28 and 30. The end rods 24 and 28 are connected by a threaded rod 32 and the end rods 26 and 30 are connected by a threaded rod 34. When rotated, the threaded rods are progressively introduced into the bores of the end rods of the strap portions and tighten the strap formed by the two portions around the pipe 10. As tightening continues, shear forces are applied to the elastomer sheet 14 thereby filling the cracks 12 and 12'.

Figure 2A:
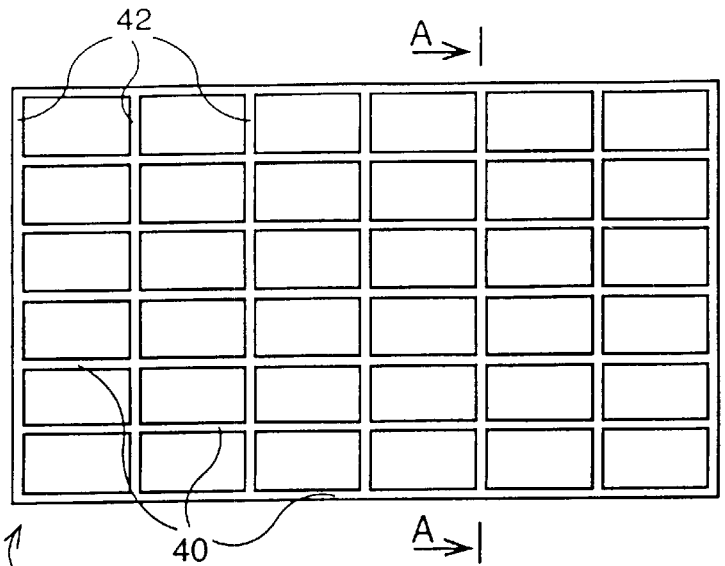
FIG. 2A represents a bottom view of the force applicator forming part of the leak stopping device according to the invention.
Figure 2B:
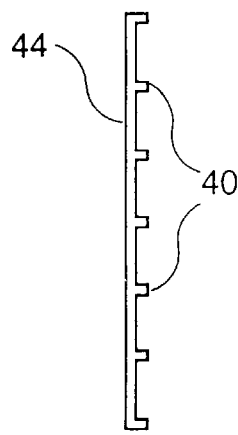
FIG. 2B represents a sectional view of the force applicator represented in FIG. 2A.

The force applicator 16 is shown in FIGS. 2A and 2B, and represents a bottom view of the applicator and a sectional view along A—A of said applicator, respectively. In the preferred embodiment of the invention, this applicator 16 is presented in the form of a lattice consisting of a first group of parallel partitions 40 arranged horizontally on the figure and a second group of parallel partitions 42 arranged vertically on the figure, the partitions of both groups being perpendicular to one another and integral with a support or backing 44.

In the preferred embodiment of the invention, the applicator 16 is in the shape of a rectangular sheet measuring 100 mm×50 mm with partitions 2 mm in depth and a thickness less than 1 mm. The material preferably used is rigid yet deformable plastic such as polyamide, polypropylene or polycarbonate, or made of metal having the same deformability characteristics, namely aluminum. In this manner, the deformability of the force applicator 16 allows the same applicator to be used regardless of the diameter of the pipe to be repaired.

It should be noted that, according to variants of the preferred embodiment of the invention, the applicator 16 may not be provided with a support or backing 44 and the partitions 40 and 42 could be presented differently, that is not necessarily arranged parallel and/or perpendicular to one another. Furthermore, the applicator may be in any shape whatsoever, triangular, rectangular or hexagonal.

Whatever the arrangement of the partitions 40 and 42 may be, one essential characteristic is that they be perpendicular to the surface of the pipe when the applicator 16 is placed on the elastomer 14, as shown in FIG. 1, that is in such a manner as to apply shear forces to the elastomer.

Figure 3:
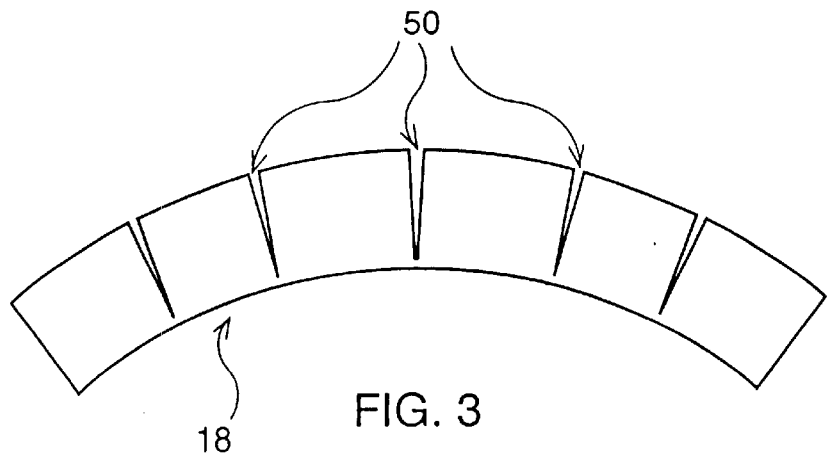
FIG. 3 represents a sectional view of a first force distributor which could be used in the leak stopping device according to the invention.

The force distributor 18, illustrated in FIG. 3, is a sheet of approximately the same dimensions as that of the applicator

16 although slightly thicker, between 0.5 cm and 4 cm, the thickness being relatively thin for a pipe of small diameter and thick (4 cm, for example) for a pipe of large diameter. In the embodiment shown in FIG. 3, the thickness is constant and features grooves 50. The fact that the grooves open during the clamping operation allow the force distributor 18 to be adapted to pipes of different diameters. The distributor 18 is preferably made of a plastic material such as polyamide, polypropylene or polycarbonate. The purpose of the distributor is to correctly distribute the clamping forces onto the force applicator 16.

Figure 4:
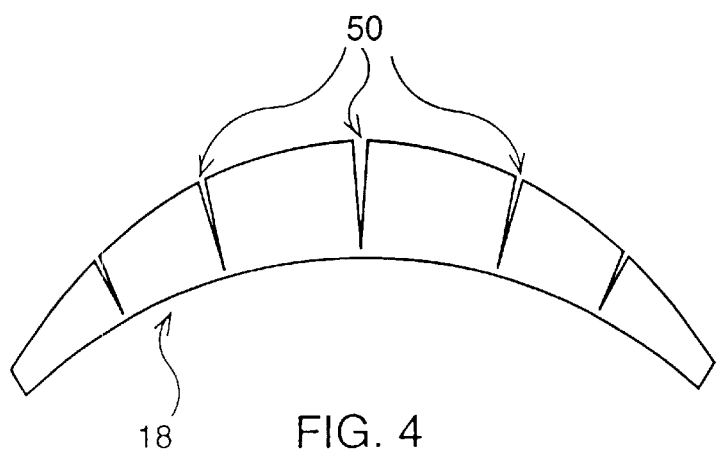
FIG. 4 represents a sectional view of a second force distributor which could be used in the leak stopping device according to the invention.

According to a variant, the force distributor may have the shape shown in FIG. 4. In this variant, it has a variable thickness which becomes thinner from the center toward the ends, for example from 2 cm to 1 cm.

Although it is not indispensable, the force distributor 18 greatly improves the efficiency of the leak stopping device according to the invention, mainly when it takes the form as shown in FIG. 4. The distributor converts the orthoradial forces into radial compression forces, the curvature of the distributor adding together with that of the pipe. In this case, the tension is no longer tangent to the surface of the system as can be seen in FIG. 1. The larger curvature allows the radial component of the tension force to be transmitted. The distributor thus allows these forces to be recovered along the entire length of the force applicator and not only at the ends. Moreover, in this manner, a force gradient increasing from the center to the ends is obtained, thereby concentrating a maximum amount of force on the leak.

In this manner, for the same clamping force enabling a pressure of 20 bar to be applied, if only the force applicator 16 is used without the force distributor is, this pressure exceeds 35 bar when a distributor of constant thickness according to FIG. 3 is used, and to more than 50 bar when a distributor of variable thickness as shown in FIG. 4 is used. Furthermore, whether the force distributor is of constant or variable thickness, it was noted that an increase in thickness, particularly in the center in the case of variable thickness and thus a greater distance from the clamping belt in relation to the pipe, allows a greater clamping pressure to be obtained capable of reaching 100 bar.

Generally speaking, the principle of the invention consists in applying a relatively weak clamping force owing to a characteristic mode of compression of an incompressible elastomer and having good creep strength. To this end, the elastomer is stressed according to its most flexible mode, that is shearing, by means of the force applicator and its partitions perpendicular to the surface of the pipe.

Although the above description presents a preferred embodiment of the invention, it is clear that changes can be made without departing from the framework of the invention. As such, any clamping mechanism may be used to implement the invention, such as a flexible steel cable of small diameter, for example. However, the use of straps (illustrated in FIG. 1) and in a general manner, several portions of straps which are inter-connected by appropriate clamping means that bring the strap portions ends closer to each other during the clamping operation (in particular, these clamping means may be threaded rods as described in the preferred embodiment of the invention), is a system which can be adapted to all pipe diameters, each pipe requiring possibly the use of 1, 2, 3 . . . portions of identical straps connected together. Moreover, it is judicious to ensure that the portions which comprise the strap be placed in a sleeve so that part of the clamping force will not be absorbed by friction forces as is the case when the strap rubs directly on the pipe during the clamping operation.

What is claimed is:

1. A device for stopping a leak in a pipe having at least one crack, comprising an elastomer sheet applied against the crack by a force applicator and a clamping mechanism arranged around the pipe for applying a force on said force applicator;

said device being characterized in that said force applicator is comprised of shearing elements arranged perpendicularly to the pipe and applying shear forces on said elastomer sheet on the location of crack, forcing the elastomer to be deformed so as to match the shape of the crack, thereby blocking it.

2. The device according to claim 1, in which said force applicator is mainly comprised of a lattice of shearing elements comprised of a first group of rigid parallel partitions and a second group of parallel partitions arranged perpendicularly to the partitions of said first group.

3. The device according to claim 2, wherein said force applicator is a rectangular-shaped sheet comprised of a first set of partitions parallel to one of the sides of the rectangle and a second set of partitions parallel to the other side of the rectangle and integral with said first set of partitions.

4. The device according to claim 1, wherein said force applicator is made of rigid, although deformable, plastic material so as to be able to adapt to pipes of different diameters.

5. The device according to claim 1, further including a force distributor placed between said force applicator and said clamping mechanism and designed to distribute the clamping forces onto said force applicator.

6. The device according to claim 5, wherein said force distributor is a sheet made of deformable plastic material having grooves in its upper part designed to adapt said force distributor to pipes of different diameters.

7. The device according to claim 6, in which said force distributor has a constant thickness between 0.5 cm and 4 cm.

8. The device according to claim 6, in which said force distributor has a variable thickness which decreases from the center outward to the ends.

9. The device according to claim 1, wherein said clamping mechanism is a strap comprised of at least two strap portions inter-connected so as to adapt to pipes of different diameters.

10. The device according to claim 9, wherein said strap portions are placed in sleeves so as to prevent part of the clamping force from being absorbed by friction forces.

* * * * *